(12) United States Patent
Darlage et al.

(10) Patent No.: US 11,772,546 B2
(45) Date of Patent: Oct. 3, 2023

(54) EDGE LIGHTING FOR A CONTINUOUS ILLUMINATION APPEARANCE

(71) Applicant: Valeo North America, Inc., Troy, MI (US)

(72) Inventors: Colby Darlage, Auburn Hills, MI (US); Robert Fraizer, Auburn Hills, MI (US); Jose Alberto Gomez Ramirez, Auburn Hills, MI (US)

(73) Assignee: Valeo North America, Inc., Troy, MI (US)

( * ) Notice: Subject to any disclaimer, the term of this patent is extended or adjusted under 35 U.S.C. 154(b) by 180 days.

(21) Appl. No.: 17/529,397

(22) Filed: Nov. 18, 2021

(65) Prior Publication Data

US 2023/0150421 A1    May 18, 2023

(51) Int. Cl.
*B60Q 1/26* (2006.01)
*F21S 43/245* (2018.01)
*F21W 107/10* (2018.01)

(52) U.S. Cl.
CPC ......... *B60Q 1/2653* (2013.01); *B60Q 1/2661* (2013.01); *F21S 43/245* (2018.01); *B60Q 2900/10* (2013.01); *F21W 2107/10* (2018.01)

(58) Field of Classification Search
CPC .... B60Q 1/2653; B60Q 1/2661; F21S 43/243
See application file for complete search history.

(56) References Cited

U.S. PATENT DOCUMENTS

| | | | |
|---|---|---|---|
| 5,101,325 A | 3/1992 | Davenport et al. | |
| 6,305,813 B1 | 10/2001 | Lekson et al. | |
| 6,322,239 B1 | 11/2001 | Nitta et al. | |
| 6,508,563 B2 | 1/2003 | Parker et al. | |
| 9,033,561 B2 | 5/2015 | Tokieda et al. | |
| 10,215,360 B1* | 2/2019 | Grogan | F21S 43/247 |
| 10,495,282 B2 | 12/2019 | Ramos, II | |
| 2008/0264956 A1* | 10/2008 | Estlander | H05K 5/0208 156/325 |
| 2013/0314935 A1 | 11/2013 | Tokieda et al. | |
| 2014/0003075 A1 | 1/2014 | Yamada et al. | |
| 2015/0369445 A1 | 12/2015 | Orr et al. | |
| 2016/0138773 A1* | 5/2016 | Kawabata | F21S 43/249 362/511 |
| 2018/0086028 A1 | 3/2018 | Berard et al. | |

FOREIGN PATENT DOCUMENTS

| | | |
|---|---|---|
| DE | 102012112075 A1 | 6/2014 |
| DE | 102016124110 A1 | 6/2017 |
| EP | 1835224 B1 | 6/2011 |
| JP | 2016012460 A | 1/2016 |

OTHER PUBLICATIONS

International Search Report for Application No. PCT/US2022/078867, dated Jan. 27, 2023, 3 pgs.

* cited by examiner

*Primary Examiner* — Julie A Bannan
(74) *Attorney, Agent, or Firm* — Young Basile Hanlon & MacFarlane, P.C.

(57) ABSTRACT

A light system of a vehicle comprising: a housing comprising: a glue bucket; a glue leg located partially or entirely within the glue bucket; and a light guide located between the glue bucket and the glue leg; wherein the light system is located proximate to a gap in the vehicle and the light guide guides light from the light guide into the glue leg and from the glue leg across the gap so that the light extends across the gap to illuminate the gap.

20 Claims, 7 Drawing Sheets

EDGE LIGHTING FOR A CONTINUOUS ILLUMINATION APPEARANCE

FIELD

The present teachings relate to a light system where two lights are separated by a space and an edge of one or both of the lights emit light into the gap so that the gap appears illuminated.

BACKGROUND

Vehicles include many different types of lights. Some types of lights included on a vehicle are low beam headlights, high beam headlights, tail lights, turn signal lights, fog lights, running lights, or a combination thereof. Each of these lights extend out of an outer surface of a vehicle so that they provide light for the driver or provide notice of surrounding drivers. These lights may have gaps of darkness where lights are not present such that the lights do not appear to be continuous.

Examples of light systems may be disclosed in U.S. Pat. Nos. 5,101,325; 6,305,813; 6,322,239; 6,508,563; 10,495,282 and U.S. Patent Application Publication Nos. 2013/0314935; 2014/0003075; and 2015/0369445 all of which are expressly incorporated herein by reference for all purposes. Thus, there is a need for a light system where the light system provides light across a gap so that the light appears to be continuous. There is a need for a system where light is projected outward from the light to fill an area that is free of light. It would be desirable to have an assembly that projects light from a pre-existing region that did not contain light.

SUMMARY

The present teachings provide: a light system of a vehicle comprising: a housing comprising: a glue bucket; a glue leg located partially or entirely within the glue bucket; and a light guide located between the glue bucket and the glue leg; wherein the light system is located proximate to a gap in the vehicle and the light guide guides light from the light guide into the glue leg and from the glue leg across the gap so that the light extends across the gap to illuminate the gap.

The present teachings provide a light system where the light system provides light across a gap so that the light appears to be continuous. The present teachings provide a system where light is projected outward from the light to fill an area that is free of light. The present teachings provide an assembly that projects light from a pre-existing region that did not contain light.

DETAILED DESCRIPTION

Figure 1:
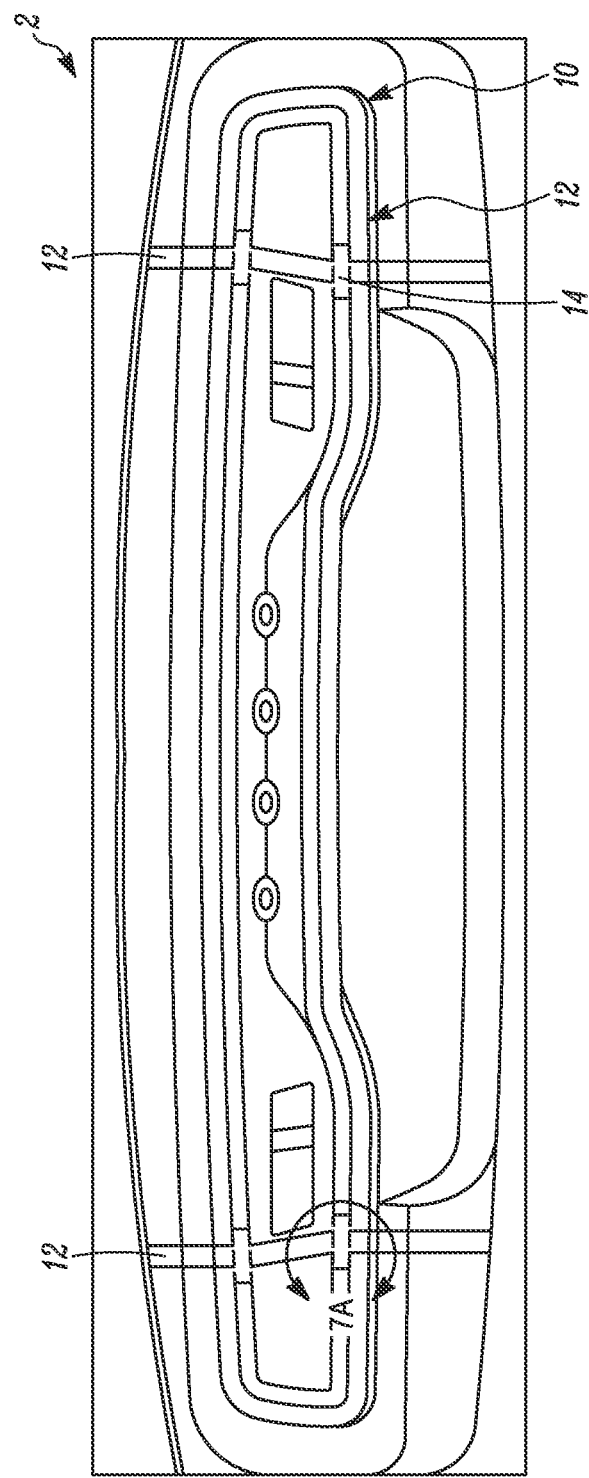
FIG. 1 is a rear view of a vehicle including the light system.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to a light system. The light system is located within a vehicle. Preferably, the light system is part of a vehicle such as a car, motorcycle, bus, truck, semi-truck, SUV, XUV, four-wheeler, dirt bike, tractor, combine, heavy equipment, farm equipment, industrial equipment, commercial equipment, or a combination thereof. The light system may project in a forward direction, rear direction, side direction, or a combination thereof. Preferably, the light system projects a light from an external surface of the vehicle to a location in front of the vehicle or at an angle relative to the front of a vehicle. The light system may direct some light at the ground. The light system may direct some light above the ground. The light system may be integrated into a front end, a rear end, or both of a car. The light system may project light out of the vehicle. The light systems may be multiple light systems stacked one above the other or integrated into a single light system. The light of the vehicle may be two or more, three or more, or four or more light systems located one above another. The light system may have a high beam and a low beam. A total height of the light systems may be decreased by placing all of the light sources in a single plane or on a same plane. The light system may include one or more light sources or a plurality of light sources.

The light sources function to produce light (e.g., one or more edge lighting sources). When more than one light source is present each of the light sources may perform different function, provide different light, perform a same function, provide a same light, or a combination thereof. The light source may be a device or a plurality of devices that create light and the light extends outward from the light source. The light source may produce a high beam, a low beam, a blending beam, a running light, a daytime light, a turn signal, a brake light, or a combination thereof. The light source may be aimed for near light, far light, blending light that blends the far light and near light together, or a combination thereof. The light sources may have different functions. For example, one light source may provide a running light and another light source may be a turn signal or fog light. The light source may comprise a plurality of lights or may be a single light source within a set of light sources. The plurality of lights may be in one set or group of light sources. The light source may be a single light that projects light. In another example, a single light source may direct light to a first location (e.g., a first light guide). The light source may be directional light. The light source may have an emission that is a Lambertian emission or a narrow emission angle. The directional light source may concentrate light on a light guide, towards a light bar, a reflector, or a combination thereof. The light source may include a laser diode, glowing phosphor, filament bulb, a light emitting diode, a halogenated light, an xenon light, or a combination thereof. The light source may create a cone of light with an optical axis. The optical axis may be directed at a light guide, a lens, a light pipe, a reflector, away from a vehicle, or a combination thereof.

The light source may be any type of lighting device that produces light such as an incandescent bulb, fluorescent light, compact fluorescent lamp, halogen lamp, light emitting diode (LED), high intensity discharge lamps (HID); halogen lights, xenon lights, a laser diode, phosphorous bulb, or a combination thereof. The light source may be a single lamp or bulb. Preferably, the light source is part of a set of light sources that includes a plurality of lamps, bulbs, diodes, or a combination thereof. The light source may be part of a set of light sources that includes two or more, 3 or more, 4 or more, or 5 more light sources that produce light and combine together to form the light extending from the light system. The sets of light source may include 50 or less, 35 or less, 20 or less, or 15 or less devices that produce light (e.g., each set may include 5 light sources or alternatively all of the sets when combined together may include 5 light sources). For example, the set of light sources may be the contents of a single printed circuit board that perform a same lighting function and the set of light sources may be 5 light sources. The set of light sources may be all of the light sources on all of the printed circuit boards that create a same lighting function and may be 15 light sources. For example, there may be 30 total light sources, but only 15 perform a same function and those may be a set of light sources. The light source may be static. Preferably, a single light source will be directed at a single reflector, lens, light pipe, or a combination thereof. The light sources may be free of movement. The light source may be fixed or may be fixed relative to a reflector or a reflector housing. The light sources may be static and may be manually or physically adjusted so that the light sources are directed to a desired location. Adjusting a reflector housing may adjust the light sources. The light sources may be fixed and the light from the light source may be moved, bent, directed, or a combination thereof by optical elements or reflectors (e.g., a light guide). Each device of the light source may be turned on and off. The light source may be located within a light system at a location relative to a light guide. Each light guide may receive light from a single light source. The light sources may work together as a set of light sources to create light. The light sources may create lighting that is visible at a location outside of a vehicle.

The lighting functions to provide an alert around a vehicle. The lighting functions to alert individuals, autonomous system, or both as to activities of a vehicle. The lighting may be the light projected outward from the light sources. The lighting may illustrate that a turn is coming or anticipated. The lighting may illustrate that a braking function is being performed, a vehicle is slowing, or both. The lighting may include a first portion on a first part of a vehicle and a second portion on a second part of a vehicle. The lighting may have a break or gap such that the lighting does not appear continuous.

The gap may be a physical space between two light sources, between lighting from two or more light sources, or both. The gap may be an appearance of non-continuous lighting. The gap may be a physical separation between a first light source and a second light source. The gap may be formed between a door and a panel, a trunk, and a body portion, a hood and a body portion, or a combination thereof so that a portion of the vehicle (e.g., hood, trunk, or door) are movable relative to the remainder of the vehicle. The gap may physically separate two or more parts of a vehicle so that one part is movable relative to the other parts. The lighting may include one or more edge light sources or edge lighting that project light across the gap, over the gap, through the gap, or a combination thereof.

The edge lighting functions to obscure the gap such that the gap is not visible. The edge lighting may be a portion of the lighting that is directed at an angle relative to the vehicle and lighting such that the gap is obscured by the edge lighting. The edge lighting may extend at an angle that is not orthogonal to the light source, the vehicle, surrounding lighting, or a combination thereof. For example, the lighting may extend substantially orthogonal to the vehicle, light source, or both and the edge lighting may extend at an angle relative to the lighting. The angle of the edge lighting relative to the lighting may be about 5 degrees or more, about 15 degrees or more, about 30 degrees or more, or about 45 degrees or more. The edge lighting may extend at an angle relative to the lighting of about 90 degrees or less, about 75 degrees or less, or about 60 degrees or less. The edge lighting may extend at any angle such that the gap is obscured by the edge lighting, the edge lighting and the lighting provide an appearance that the light is continuous, or both. Multiple different edge lights may be present. When multiple edge lights are present they may be different colored lights. When multiple edge lights are present They all may be on, some may be on and some may be off, one may be on, one may be off, or a combination thereof. Preferably, when one edge light turns on another edge light turns off. The edge lighting may project out of a portion of housing that different than the light, a side of the housing, or both.

The housing functions to connect all or a portion of the lighting system to a vehicle or within a vehicle. The housing may contain all or a portion of a light, a light source, a reflector, a light pipe, a lens, or a combination thereof. The housing may form an outer portion of a lighting system, a portion of a lighting system that connects to a vehicle, a portion of a lighting system that extends into a vehicle, or a combination thereof. The housing may entirely be located within a single component of a vehicle. For example, each housing may be located within a single components and two adjacent housings may be spaced apart by a gap. The gap may physically separate two housings. The housing may house the light sources. The housing may assist in projecting the light or aiming the light. The housing may protect the light system. The housing may include one or more portions.

The one or more portions of the housing may be separate pieces connected to a vehicle to make up one lighting system. The one or more portions may be discrete pieces that are free of any direct connection. The one or more portions may be located on or connected to discrete pieces. The two or more portions may be spaced part by a gap. The housing may house one or more reflectors.

The one or more reflectors or reflective surface (hereinafter reflector) function to reflect light outward to provide the lighting. The one or more reflectors may provide indirect light. The one or more reflectors may aim the light. The one or more reflectors may provide a running light, a high beam, a low beam, a turn signal, a brake light, or a combination thereof. The one or more reflectors may be located within the housing. The one or more reflectors may be located inside of a housing and in front of an interior housing. The one or more reflectors may hide the interior housing from view. The one or more reflectors may extend on an outward side of the interior housing and be connected to the internal housing. The reflector may be a reflective surface on an exterior surface of the interior housing.

The interior housing functions to support the one or more reflectors, indirectly connect the reflector and the housing, support a light source, form a wall that a reflector is formed or applied, or a combination thereof. A light source may be located between the reflector and the interior housing. The interior housing may form an interior space. The interior space may be located between the interior housing and the housing. The interior housing may be located behind a lens, a leg, an exterior portion, or a combination thereof. The interior housing, the housing, the reflector, or a combination thereof may form a glue bucket, close a glue bucket, or both.

The glue bucket functions to form an open area that receives glue so that two or more components may be connected together. The glue bucket may have a main portion that is part of the housing. The glue bucket may be formed by, between, or both the housing, the interior housing, the reflector, a lens, or a combination thereof. The glue bucket may be a recess in the housing that receives a portion of the reflector, the lens, a leg of the lens, the interior housing, or a combination thereof so that the reflector, the interior portion, the lens, the leg, or a combination thereof are connected together. The reflector, the interior housing, lens, or a combination thereof may close all or a portion of the glue bucket. The glue bucket may have one or more walls, two or more wall, three or more walls, or four or more walls. The glue bucket may have one or more walls formed by the housing, two or more walls formed by the housing, or three or more walls formed by the housing. The glue bucket may have one or more walls, two or more walls, or three or more walls that are partially or entirely formed by the interior housing, the reflector, the lens, a leg of the lens, or a combination thereof. The glue bucket may include or be adjacent to one or more through holes (or openings).

The one or more through holes or openings function to permit light to exit the housing, the glue leg bucket, or both. The one or more through holes or openings may be located proximate to a gap, in a direction of a gap, or both. The one or more through holes may receive or be connected to a light pipe, a lens, a light guide, or a combination thereof. The one or more through holes may extend in a direction that is different than the lighting, or an opening in the housing. The one or more through holes (e.g., or opening) may allow light to extend outward of the housing. The one or more though holes may include a lens, a transparent piece, or both that permits light to exit the housing. The one or more through holes may allow light to exit in a direction other than a forward direction, opening of the light system, opening in the housing, or a combination thereof. The housing, the lenses, the legs, the glue legs, or a combination thereof may be free of any through holes or openings. An opening that exposes the leg, a portion of the glue leg, or both may be located on an adjacent surface as the lens. For example, a typical lens may be located on a rear of a vehicle and a portion of the lens creating the edge lighting may extend into the gap such that the lens in in a different plane. The one or more through holes, openings, or both may permit all or a portion of a leg to extend out of the housing, coplanar with a wall of the housing, or both.

The one or more glue legs function to extend into the glue bucket. The one or more glue legs function to form a connection with the glue bucket. The glue legs function to guide light from a light source, a light guide, or both to an external location. The glue leg functions to transmit light through a through hole or opening, across a gap, through a gap, or a combination thereof. The glue leg may extend into the glue bucket, be connected within the glue bucket, or both. The glue leg may be a lens or part of a lens. The glue leg may include a leg. The glue leg, leg, or both may be part of and extend from the lens. The glue leg may be transparent. The glue lens may transmit light to a leg, an exterior surface, a lens, or a combination thereof. The glue leg may be made of or include polycarbonate (PC), a polymethyl methacrylate (PMMA), nylon, a polymethylmethyacrylimide (PMMI), a high heat PMMI, or a combination thereof. The glue leg may be hollow. The glue leg may be solid. The glue leg may be transparent. The glue leg may be made of a translucent material. The glue leg may reflect light, refract light, spread light, or a combination thereof. The glue leg may receive light at a predetermined location. The glue leg may emit light at a predetermined location. Light may reflect within the glue leg. Light may extend through the glue let such that light extend from a first location to a second location. The glue leg may align with a light guide, a light source, or both.

The light guide functions to direct light from a first location to a second location. The light guide may be in contact or communication with a light source at a first end and a glue leg at a second end. The light guide may transport light from the light source into the glue leg. The light glide may be a lens that passes light into the glue leg. The light glide may be light pipe. The light guide may be a substantially planar component. The light guide may be a tube. The light guide may be a fiber optic cable. The light guide may have a length of about 2 mm or more, 5 mm or more, 1 cm or more, 3 cm or more, 5 cm or more, 10 cm or more, or 20 cm or more. The light guide may have a length of about 50 cm or less, about 35 cm or less, or about 25 cm or less. The light guide may extend a length of a glue bucket. The light guide may extend a partial length of a glue bucket. The light guide may be connected within or supported along all or a portion of a glue bucket.

The support functions to align the light guide with a light source, an opening, a through hole, a gap, or a combination thereof. The support may fixedly connect the light guide to the housing, the interior housing, the reflector, or a combination thereof. The support may hold the light guide in place during an application of adhesive. The support may maintain alignment of the light guide to a light source, an opening, a through hole, or a combination thereof. The support may be a clip, a two-sided tape, a metal fastener, a plastic fastener, a fastener that is complementary in shape to the light guide, complementary in shape to the glue bucket, or a combination thereof. The support may maintain the light guide in place until an adhesive is applied.

The adhesive functions to connect two or more parts together. The adhesive functions to transmit light. The adhesive may connect a glue leg, a light guide, a support, a reflector, an interior housing, or a combination thereof together. The adhesive may fill all or a portion of a glue bucket. The adhesive may become solid after the adhesive is placed within the glue bucket. The adhesive may prevent movement of the components once the adhesive dries, cures, solidifies, or a combination thereof. The adhesive may be water curable, UV cure, moisture cure, heat cured, volatile and cure without an initiator, or a combination thereof. The adhesive may cure in 1 week or less, 3 days or less, 1 day or less, 12 hours or less, or 6 hours or less. The adhesive may cure in about 1 minute or more, about 5 minutes or more, or 15 minutes or more. The adhesive may be glue. The adhesive may be a polymer. The adhesive may be a single shot component. The adhesive may be a two-part component. The adhesive may cure clear. The adhesive may cure and be hard such that all of the components are connected together. The adhesive may be or include a hot melt, silicone, acrylic, or a combination thereof.

FIG. 1 illustrates a vehicle 2 with a light system 10. The vehicle 2 includes a gap 12 that extends through the light system 10. The light system 10 includes edge lighting 14 that projects light across the gap 12 or obscures the gap 12 with light so that the light of the light system 10 appears to be continuous.

Figure 2:
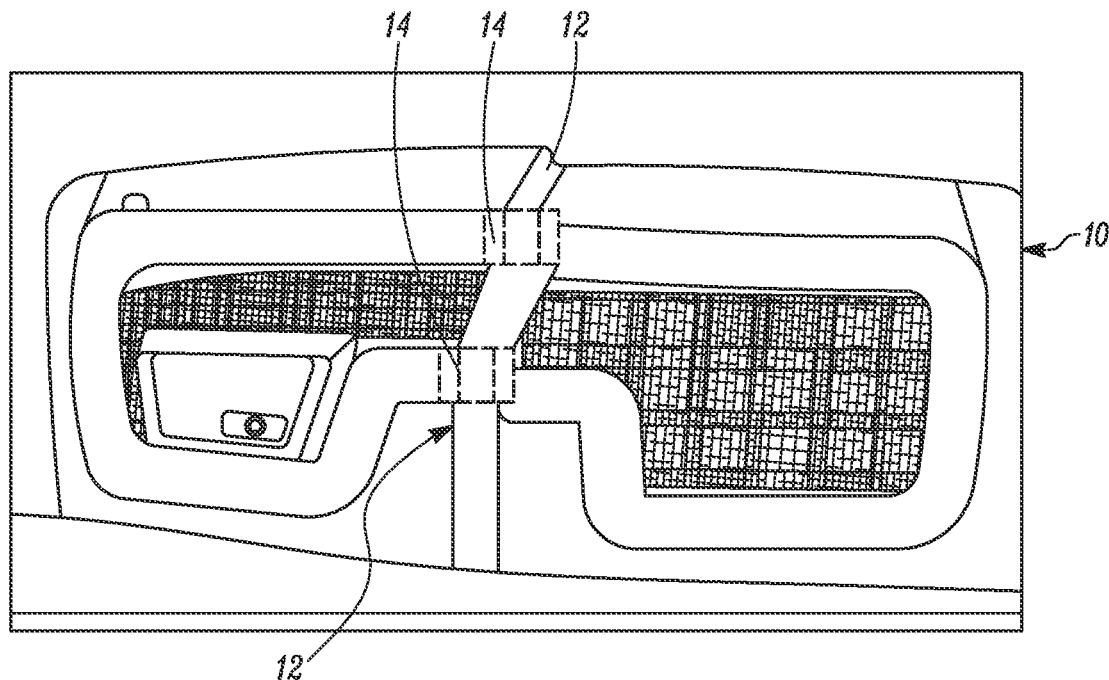
FIG. 2 is close-up view of a light system filling a gap in the vehicle.

FIG. 2 illustrates a close-up view of a light system 10. The light system 10 includes edge lighting 14 that projects light across the gap 12 so that the gap 12 is not visible proximate to the light system 10.

Figure 3:
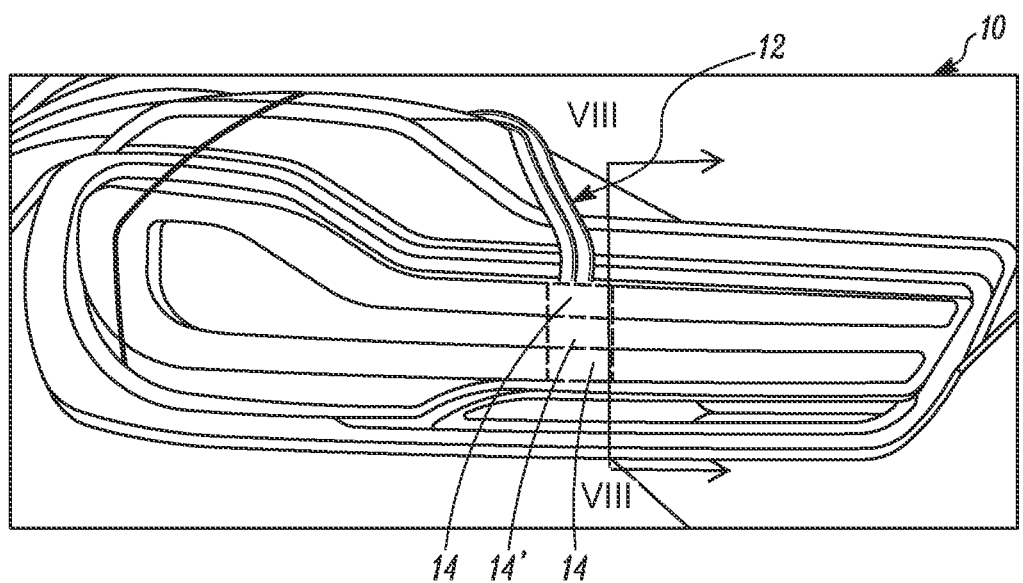
FIG. 3 is a close-up view of a light system filling a gap in the vehicle.

FIG. 3 is a close-up view of a light system 10 with multiple color edge lights 14. The edge lighting 14 as shown projects two different colors (e.g., red, white, or yellow) lighting across the gap 12 so that the entire gap 12 appears to be hidden and is not visible. A first of the edge lighting 14 projects a first color and the second of the edge lighting 14' projects a second color. The first lighting 14 and the second lighting 14' may be illuminated at a same time. When the first light 14 is on the second light 14' may be off and vice versa.

Figure 4:
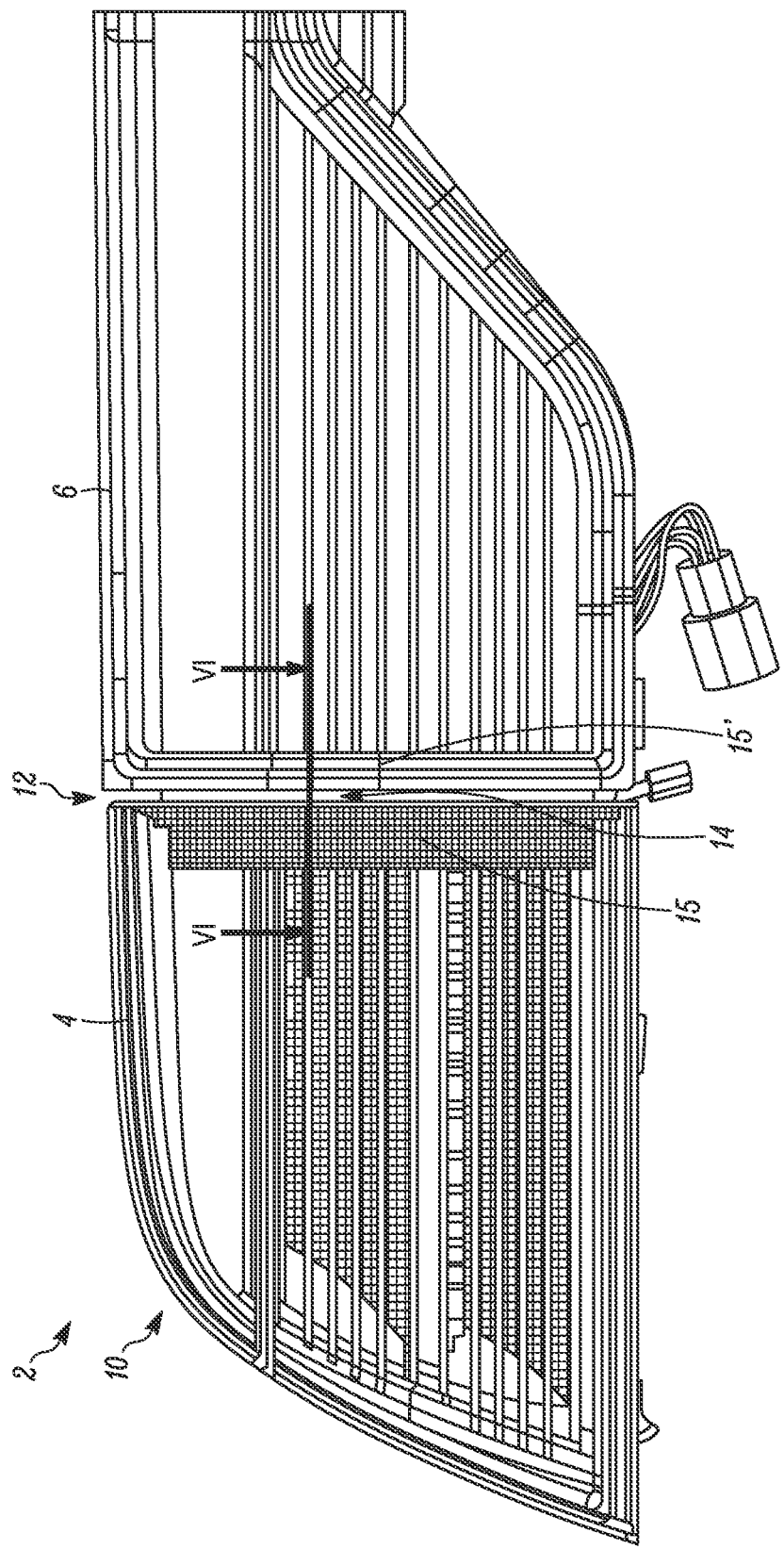
FIG. 4 illustrates an internal portion of a light.

FIG. 4 illustrates a partial interior view of housing 16 of a light system 10 of a vehicle 2. The light system 10 includes a first vehicle part 4 and a second vehicle part 6 separated by a gap 12. Both the first vehicle part 4 and the second vehicle part 6 include lighting 15 and 16'. The lighting 15 and 15' including edge lighting 14 that extends from a side of the light system 10 or in an edge direction to obscure the gap 12.

Figure 5:
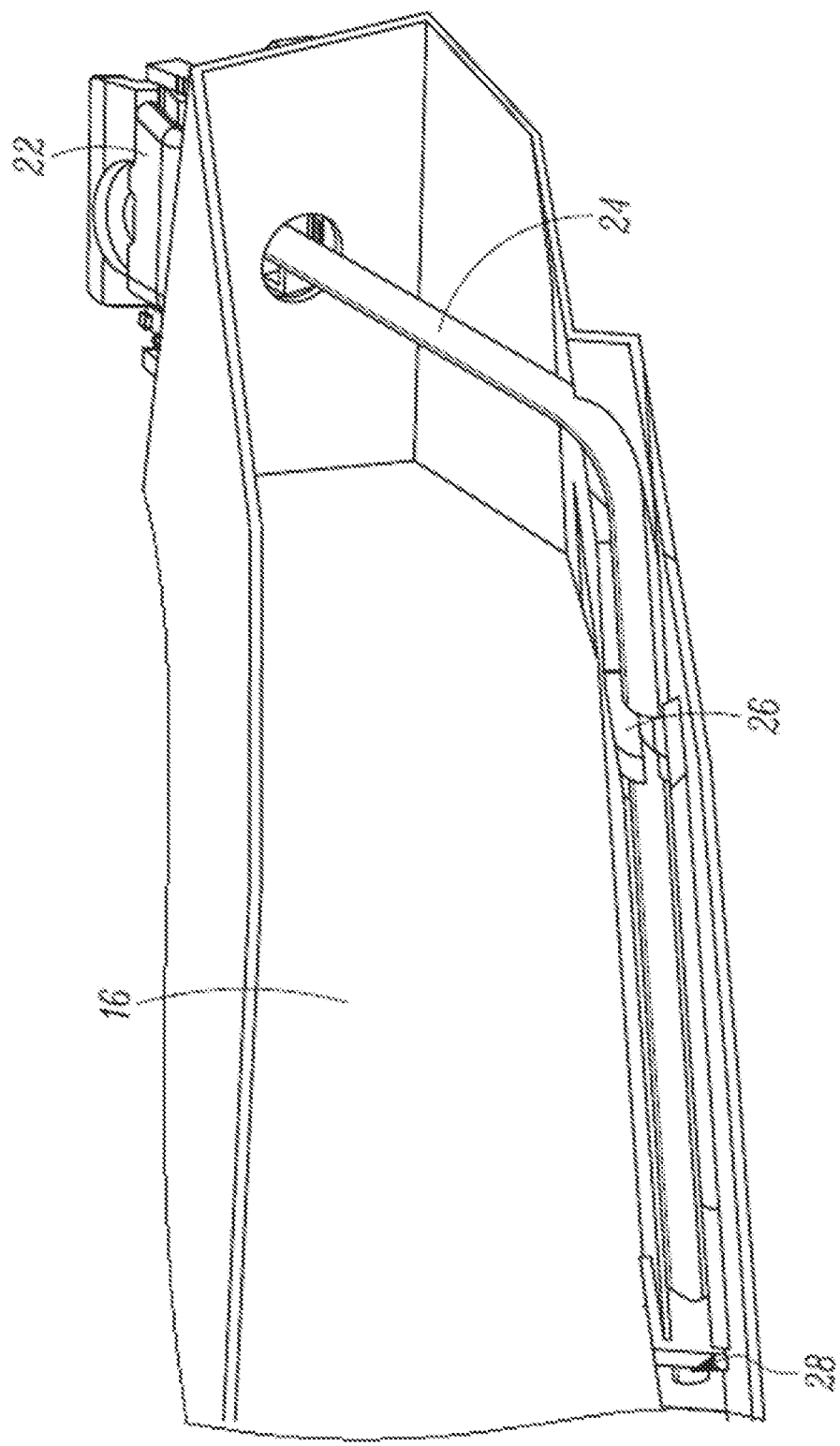
FIG. 5 illustrates a housing of the light of FIG. 4 with a light pipe visible.

FIG. 5 illustrates the housing 16 with a light guide 24 exposed. The housing 16 includes broken edges such that the shape and bounds of the housing 16 are variable. The light guide 24 is connected to an edge lighting source 22 at an end that projects light through the light guide 24 to an edge of the housing 16 while the housing 16 blocks light from extending out of the light system at any other location except for the through hole or opening 28 in the housing 16. The light guide 24 is connected within the housing 16 by supports 26.

Figure 6:
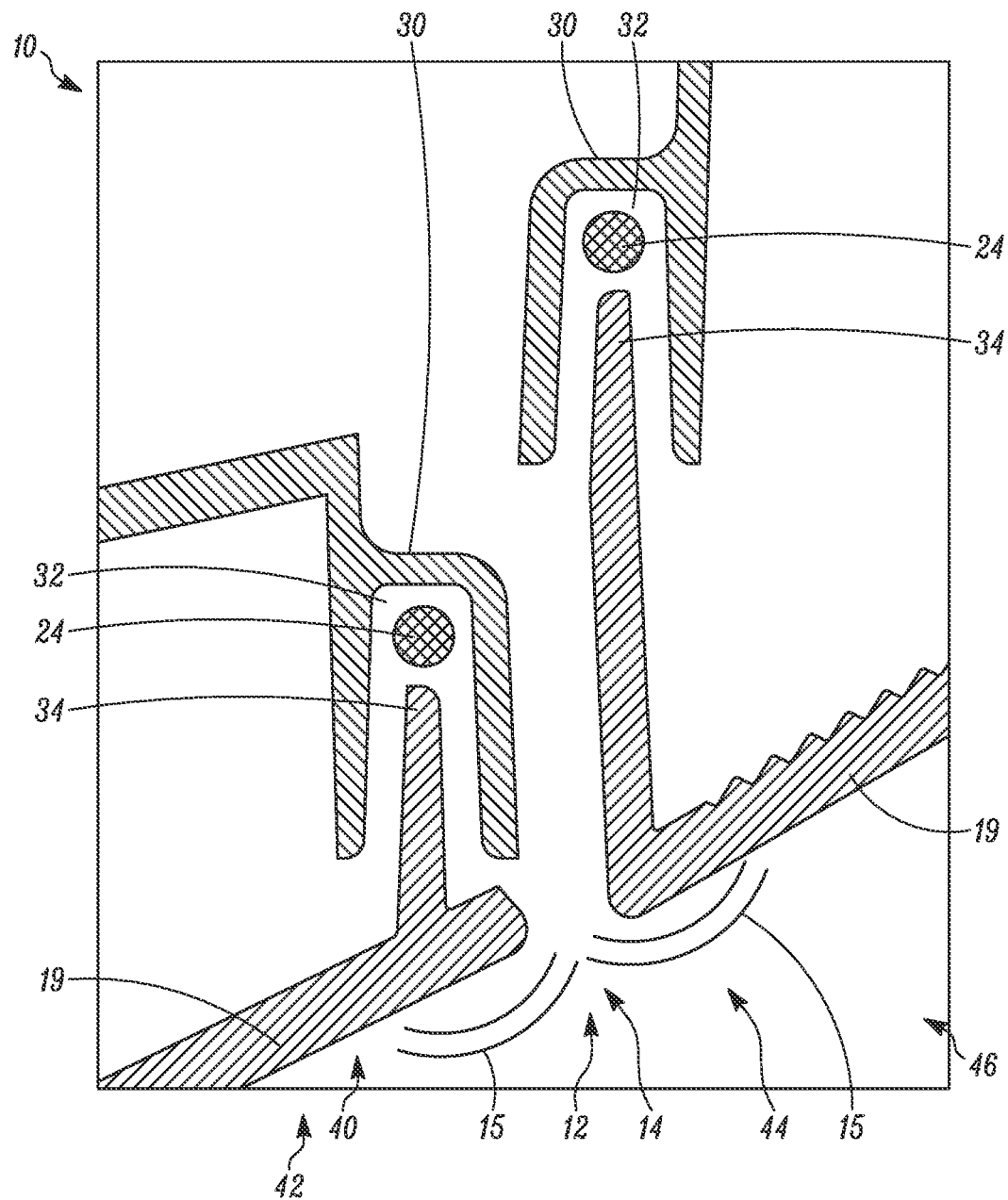
FIG. 6 is a cross-sectional view of the light system of FIG. 4.

FIG. 6 is a cross-sectional view of the light system 10 of FIG. 4 along lines VI-VI. The light system 30 includes a glue bucket 30 comprising the light guide 24 and a portion of the glue leg 34 that are partially or entirely located within glue 32. The glue leg 34 is located proximate to the light guide 24 to receive light therefrom and to move light into the leg 19 so that the leg 19 can distribute the light. A first leg 19 has a first portion 40 located on a first side 42 a gap 12 and a second leg 19 includes a second portion 44 located on a second side 46 of the gap 12. The first leg 19 and the second leg 19 include lighting 15 and edge lighting 14 that extends towards the gap 12

Figure 7A:
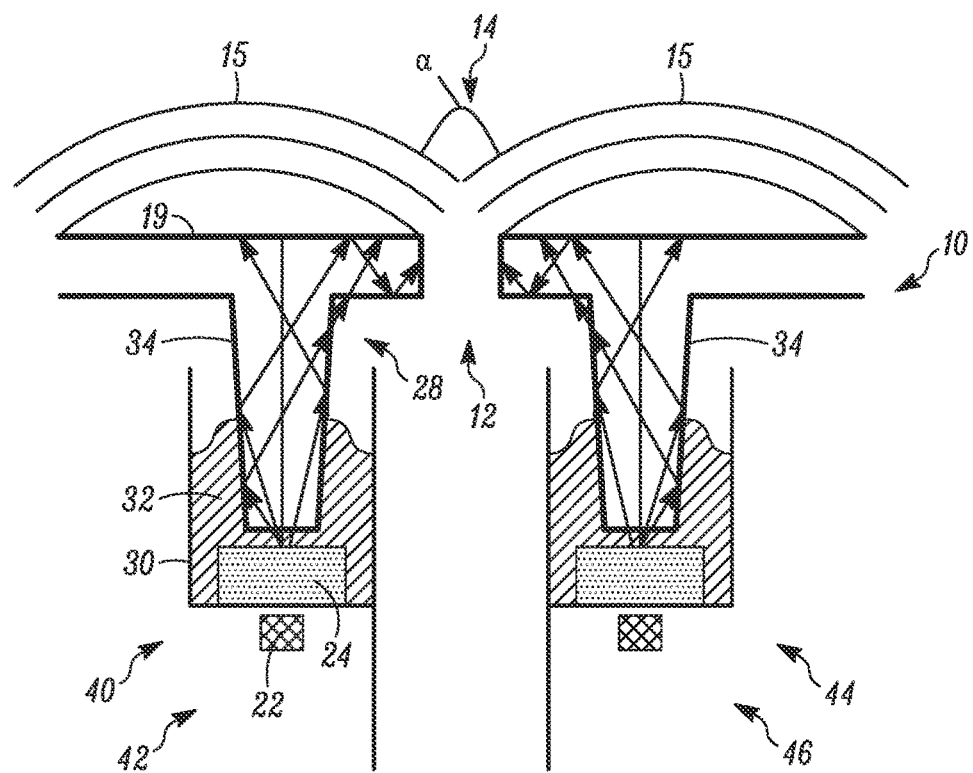
FIG. 7A is a cross-sectional view of the gap being illuminated.

FIG. 7A is a close-up view of a light system 10 proximate to a gap 12. The light system 10 includes two edge lights 14 that extend at an angle (α) relative to lighting 15 from opposing sides of a gap 12 to cover the gap 12 so that the gap 12 appears to be continuous. The edge lighting 14 and the lighting 15 are formed by an edge lighting source 22 that projects light into a light guide 24 (which as shown is a lens and LED) located within a glue leg 30. The light guide 24 directs the edge lighting 14 and the lighting 15 through the glue bucket 30. The glue bucket 30 includes glue or adhesive 32 that fill the glue bucket 30 and connect a leg 19, which includes a glue leg 34 inside of the glue bucket 30 together. The edge lighting 14 and the lighting 15 pass through the glue or adhesive 32 into the glue leg 34. The glue bucket 30 includes a through hole or an opening 28 that permits the glue leg 34, edge lighting 14, or both to extend into or proximate to the gap 12 to project edge lighting 14 into the gap 12. The lighting system 10 includes a first portion 40 on a first side 42 of the gap 12 and a second portion 44 on a second side 46 of the gap 12 and both the first portion 40 and the second portion 44 project edge lighting 14 into the gap 12 so that the gap is hidden and the light 14 and 15 appears continuous.

Figure 7B:
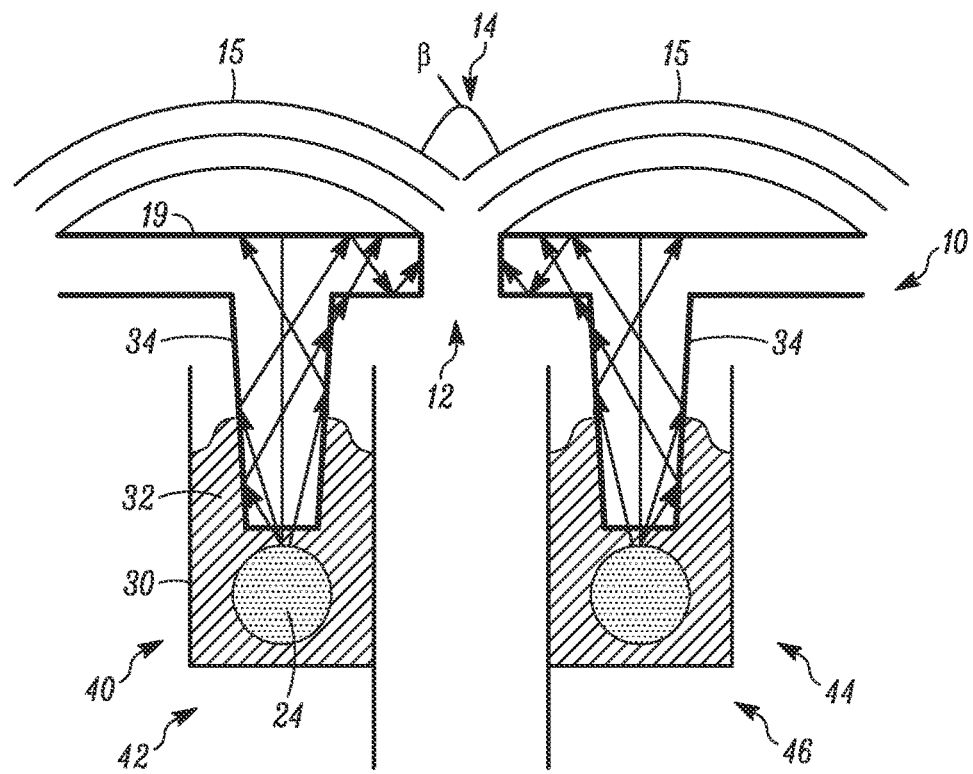
FIG. 7B is a cross-sectional view of the gap being illuminated.

FIG. 7B is a close-up view of a lighting system 10 comprising a light guide 24 located within a glue bucket 30. The glue bucket 30 includes glue and/or adhesive 32 that surround all or a portion of the light guide 24 and maintains the light guide 24 adjacent to a leg 19 of a lens having a glue leg. 34. The light guide 24 as shown is a light pipe and light extends from the light guide 24 through the glue 32 into the glue leg 34. The light guide 24 is proximate to the leg 19 where the light projects as edge lighting 14 and lighting 15. The lighting 15 extends outward from the leg 19 in a direction substantially normal to the lighting system 10. The edge lighting 14 extends at an angle (β) relative to the lighting 15 so that the edge lighting covers and/or blocks the gap 12. The lighting system 10 includes a first portion 40 on a first side 42 of the gap 12 and a second portion 44 on a second side 46 of the gap 12 so that the gap 12 is completely covered by edge light 14 and the edge light 14 and the light 14 have a continuous appearance.

Figure 8:
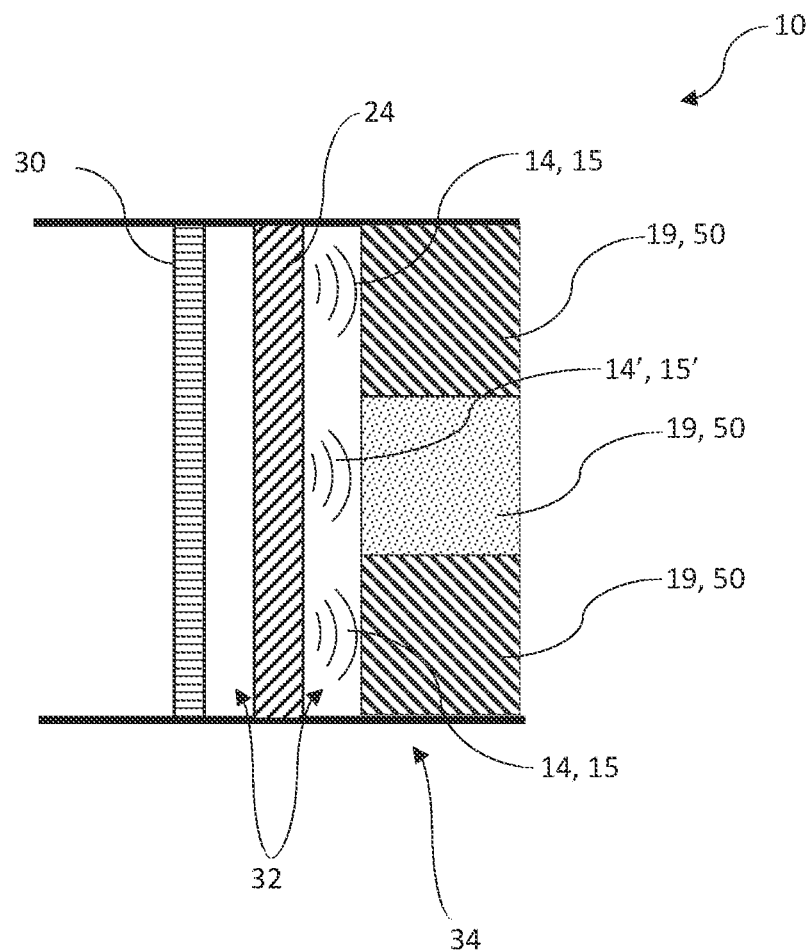
FIG. 8 is a cross-sectional view of FIG. 3 along lines VIII-VIII.

FIG. 8 is a cross-sectional view of the lighting system 10 of FIG. 3 along lines VIII-VIII. An outside of the lighting system 10 is a lens 50 having three parts that each include a leg 19. As shown, the lens 50 includes a first color sandwiching a second color so that the lighting 14, 14' and the edge lighting 15, 15' extending through the lenses 50 have a different color. The lighting 14, 14' and the edge lighting 15, 15' are projected from a light guide 24 and through glue 32 into the lens 50. A glue bucket 30 contains the light guide 24 and the glue 32.

Variation 1 comprises: a light system of a vehicle comprising: a housing comprising: a glue bucket; a glue leg located partially or entirely within the glue bucket; and a light guide located between the glue bucket and the glue leg; wherein the light system is located proximate to a gap in the vehicle and the light guide guides light from the light guide into the glue leg and from the glue leg across the gap so that the light extends across the gap to illuminate the gap.

Variation 2 may comprise the light system of variation 1, further comprising the light system includes a first portion on a first side of the gap and a second portion on a second side of the gap and the light extends from the first side towards the second side and from the second side towards the first side so that the gap is covered by light.

Variation 3 may comprise the light system of any of variations 1-2, wherein the light system provides the light in a direction substantially normal to the housing and the light from the light guide extends at an angle of about 15 degrees or more and about 90 degrees or less relative to the light extending in the direction substantially normal to the housing.

Variation 4 may comprise the light system of variation 3 or any of variations 1-3, wherein the light guide is a lens in communication with a light emitting diode (LED) or a light pipe in including an LED at an end of the light pipe.

Variation 5 may comprise the light system of any of variations 1-4, wherein the glue bucket includes glue.

Variation 6 may comprise the light system of variation 5 or any of variations 1-5, wherein the glue is fully or partially transparent so that the light from the light guide extends through the glue into the glue leg.

Variation 7 may comprise the light system of variation 5 or any of variations 1-6, wherein the glue surrounds all or a portion of the light guide and light extends from the light guide through the glue and into the glue leg.

Variation 8 may comprise the light system of variation 1 or any of variations 1-7, wherein the housing includes a through hole or an opening at a region proximate to the gap so that the light is directed through the through hole or opening across the gap.

Variation 9 may comprise the light system of variation 8 or any of variations 1-8, wherein the glue leg extends out of the through hole or opening so that the light from the glue leg is directed across the gap.

Variation 10 may comprise the light system of variation 4 or any of variations 1-9, wherein the lens is made of a polycarbonate (PC), a polymethyl methacrylate (PMMA), nylon, a polymethylmethyacrylimide (PMMI), a high heat PMMI, or a combination thereof and the lens is transparent, free of coloring, or both.

Variation 11 may comprise the light system of variation 5 or any of variations 1-10, wherein the glue is made of or includes a hot melt, silicone, acrylic, a polyurethane, or a combination thereof and the glue is free of any coloring, is transparent, or both.

Variation 12 may comprise the light system of variation 1 or any of variations 1-11, wherein all or a portion of the glue bucket is opaque, includes a light blocker, has exterior painting, or a combination thereof that prevent the light from extending from the light guide to a region where the light is unwanted.

Variation 13 may comprise the light system of variation 12 or any of variations 1-12, wherein the light from the light guide only provides the light at a location proximate to the gap.

Variation 14 may comprise the light system of any of variations 1-13, or may comprise: a light system of a vehicle comprising: a housing comprising: a glue bucket; a light guide located within the glue bucket; and an adhesive located within the glue bucket and partially or fully surrounding the light guide; wherein the light system is located proximate to a gap in the vehicle and light from the light guide extends from the light guide through the adhesive and extends across the gap to illuminate the gap so that the gap is covered and the light appears to be continuous across the gap.

Variation 15 may comprise the light system of variation 14 or any of variations 1-14, wherein the adhesive is transparent.

Variation 16 may comprise the light system of variation 14 or any of variations 1-15, wherein the adhesive is transparent, but includes coloring so that the light emitted through the adhesive is a color other than white.

Variation 17 may comprise the light system of variation 14 or any of variations 1-16, wherein the adhesive is made of or includes a hot melt, silicone, acrylic, a polyurethane, or a combination thereof and the adhesive is transparent.

Variation 18 may comprise the light system of variation 15 or any of variations 1-17, wherein a glue leg is located fully or partially within the glue bucket, the adhesive connects the glue leg to the glue bucket, and the glue leg distributes the light from the light guide outward from the vehicle and across the gap.

Variation 19 may comprise the light system of variation 15 or any of variations 1-18, wherein some of the light from the light guide extends out of the light system in a direction substantially normal to the light system and some of the light from the light guide extends at an angle of about 10 degrees or more and about 90 degrees or less relative to the direction substantially normal to the light system.

Variation 20 may comprise the light system of variation 18 or any of variations 1-19, wherein the light guide is a light pipe with a light source located at an end of the light pipe and the light pipe guides light only into the glue leg so that the glue leg distributes the light.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of or even consists of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

ELEMENT LIST

2 Vehicle
10 Lighting System
12 Gap
14 Edge Lighting
15 Lighting
16 Housing
18 Lens
19 Leg
20 Interior Housing
21 Reflector
22 Edge Light Source
24 Light Guide
26 Support
28 Through hole or Opening
30 Glue Bucket
32 Glue
34 Glue Leg
40 First Portion
42 First Side
44 Second Portion
46 Second Side
50 Lens

We claim:

1. A light system of a vehicle comprising:
a housing comprising:
a glue bucket;
a glue leg located partially or entirely within the glue bucket; and
a light guide located between the glue bucket and the glue leg;
wherein the light system is located proximate to a gap in the vehicle and the light guide guides light from the light guide into the glue leg and from the glue leg across the gap so that the light extends across the gap to illuminate the gap.

2. The light system of claim 1, wherein the light system includes a first portion on a first side of the gap and a second portion on a second side of the gap and the light extends from the first side towards the second side and from the second side towards the first side so that the gap is covered by light.

3. The light system of claim 1, wherein the light system provides the light in a direction substantially normal to the housing and the light from the light guide extends at an angle of about 15 degrees or more and about 90 degrees or less relative to the light extending in the direction substantially normal to the housing.

4. The light system of claim 1, wherein the light guide is a lens in communication with a light emitting diode (LED) or a light pipe in including an LED at an end of the light pipe.

5. The light system of claim 1, wherein the glue bucket includes glue.

6. The light system of claim 5, wherein the glue is fully or partially transparent so that the light from the light guide extends through the glue into the glue leg.

7. The light system of claim 5, wherein the glue surrounds all or a portion of the light guide and light extends from the light guide through the glue and into the glue leg.

8. The light system of claim 1, wherein the housing includes a through hole or an opening at a region proximate to the gap so that the light is directed through the through hole or opening across the gap.

9. The light system of claim 8, wherein the glue leg extends out of the through hole or opening so that the light from the glue leg is directed across the gap.

10. The light system of claim 4, wherein the lens is made of a polycarbonate (PC), a polymethyl methacrylate (PMMA), nylon, a polymethylmethyacrylimide (PMMI), a high heat PMMI, or a combination thereof and the lens is transparent, free of coloring, or both.

11. The light system of claim 5, wherein the glue is made of or includes a hot melt, silicone, acrylic, a polyurethane, or a combination thereof and the glue is free of any coloring, is transparent, or both.

12. The light system of claim 1, wherein all or a portion of the glue bucket is opaque, includes a light blocker, has exterior painting, or a combination thereof that prevent the light from extending from the light guide to a region where the light is unwanted.

13. The light system of claim 12, wherein the light from the light guide only provides the light at a location proximate to the gap.

14. A light system of a vehicle comprising:
a housing comprising:
a glue bucket;
a light guide located within the glue bucket; and
an adhesive located within the glue bucket and partially or fully surrounding the light guide;
wherein the light system is located proximate to a gap in the vehicle and light from the light guide extends from the light guide through the adhesive and extends across the gap to illuminate the gap so that the gap is covered and the light appears to be continuous across the gap.

15. The light system of claim 14, wherein the adhesive is transparent.

16. The light system of claim 14, wherein the adhesive is transparent, but includes coloring so that the light emitted through the adhesive is a color other than white.

17. The light system of claim 14, wherein the adhesive is made of or includes a hot melt, silicone, acrylic, a polyurethane, or a combination thereof and the adhesive is transparent.

18. The light system of claim 15, wherein a glue leg is located fully or partially within the glue bucket, the adhesive connects the glue leg to the glue bucket, and the glue leg distributes the light from the light guide outward from the vehicle and across the gap.

19. The light system of claim 15, wherein some of the light from the light guide extends out of the light system in a direction substantially normal to the light system and some of the light from the light guide extends at an angle of about 10 degrees or more and about 90 degrees or less relative to the direction substantially normal to the light system.

20. The light system of claim 18, wherein the light guide is a light pipe with a light source located at an end of the light pipe and the light pipe guides light only into the glue leg so that the glue leg distributes the light.

* * * * *